United States Patent
Moreno et al.

(12) 
(10) Patent No.: US 6,390,444 B1
(45) Date of Patent: May 21, 2002

(54) TWO-STAGE PARALLEL SPRING SOLENOID VALVE

(75) Inventors: Alejandro Moreno, El Paso, TX (US); Javier Gomez, Juarez Chih (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/483,200

(22) Filed: Jan. 14, 2000

(51) Int. Cl.[7] .......................... F16K 31/12; F16K 31/02
(52) U.S. Cl. ................. 251/129.19; 251/30.01
(58) Field of Search ............. 251/30.01, 30.02, 251/129.19; 303/119.2

(56) References Cited

U.S. PATENT DOCUMENTS

| | | | |
|---|---|---|---|
| 2,121,657 A | * 6/1938 | Fisher | |
| 2,392,741 A | * 1/1946 | Hurlburt | |
| 3,473,780 A | * 10/1969 | Harms | |
| 3,970,282 A | * 7/1976 | Hansen | 251/129 |
| 4,008,876 A | * 2/1977 | Bastle | 251/129 |
| 5,681,097 A | * 10/1997 | Tackett et al. | 303/119.2 |
| 6,065,495 A | * 5/2000 | Fong et al. | 137/625.25 |

FOREIGN PATENT DOCUMENTS

| | | |
|---|---|---|
| DE | 4204417 | 8/1993 |
| DE | 19504246 | 8/1996 |
| DE | 19510288 | 9/1996 |
| DE | 19531007 | 2/1997 |
| DE | 19801529 | 7/1999 |
| DE | 19810241 | 9/1999 |

* cited by examiner

*Primary Examiner*—Kevin Shaver
*Assistant Examiner*—David A Bonderer
(74) *Attorney, Agent, or Firm*—Margaret A. Dobrowitski

(57) ABSTRACT

A two-stage parallel spring solenoid valve (100) includes a coil housing (102) with a plunger tube (108) disposed therein. Disposed within the distal end (112) of the plunger tube (108) is a valve body (128) that includes a valve seat (138). A plunger assembly (160) is disposed within the plunger tube (108) and includes a plunger (162) and a plunger rod (184). An external spring (170) and an internal spring (190) are installed in parallel with each other within the plunger assembly (160). The valve (100) is movable from a closed configuration wherein the plunger rod (184) is seated against the valve seat (138) to block fluid flow through the valve (100), to an intermediate configuration wherein the plunger (162) further compresses the external spring (170) and the internal spring (190) and the plunger rod (184) remains seated against the valve seat (138), and to an open configuration, wherein the plunger rod (184) is distanced from the valve seat (138) to permit fluid flow through the valve (100).

5 Claims, 5 Drawing Sheets

TWO-STAGE PARALLEL SPRING SOLENOID VALVE

TECHNICAL FIELD

The present invention relates to devices used to control the flow of fluid through vehicle fluid systems, such as a vehicle brake system.

BACKGROUND OF THE INVENTION

For many people, when purchasing a motor vehicle, the way the car or truck handles is very important. Because of this, many vehicles are equipped with vehicle stability enhancement (VSE) control systems. Part of the function of VSE control systems is undertaken by an automatic braking system (ABS), which regulates the pressure within the vehicle wheel brake cylinders to maximize the stability of the vehicle while braking.

It happens that current ABS use several solenoid valves to control the flow of fluid between the component parts of the system. In order for the ABS to operate properly, a pump prime valve may be installed between a master cylinder/ reservoir and a system pump.

When the brakes are applied, a relatively large pressure is generated within the pump prime valve. A spring within the valve keeps it closed until the control system energizes a coil that opens the valve. Due to the high fluid pressure across the valve when the brakes are applied, it is necessary that the spring which keeps the valve closed has a relatively large spring constant. The coil must be capable of creating a magnetic force that will overcome this spring force in addition to the hydraulic forces within the valve.

Accordingly, current solenoid valves must include a relatively large coil in order to overcome the force of the spring, which, in turn, results in a more expensive valve. A smaller, and less expensive, coil cannot be used in such valves because it would be incapable of providing the force necessary for opening the valve, without overheating or otherwise being damaged.

In light of the above problems, the present invention recognizes a need for a solenoid valve which is capable of operating under high braking pressures, while minimizing the size of the activating coil.

SUMMARY OF THE INVENTION

A two-stage parallel spring solenoid valve is configured for use in a vehicle fluid system and includes a coil housing with a coil disposed therein. Additionally, the valve forms a fluid communication path that is selectively blocked by a plunger assembly slidably disposed relative to the coil housing. The plunger assembly includes a plunger and a rod that are slidably received in the plunger. Moreover, disposed within the plunger assembly is an internal spring that urges the rod to move relative to the plunger and an external spring that urges the plunger to move relative to the housing. As such, the springs cooperate to move the plunger assembly to block the fluid communication path when the coil is de-energized and the coil is selectively energized to cause the plunger assembly to move to open the fluid communication path.

In a preferred embodiment, the two-stage parallel spring solenoid valve includes a hollow plunger tube that is disposed in the housing. The plunger tube defines a distal end and forms at least one port. Preferably, a valve body is disposed at the distal end of the plunger tube and includes a valve seat that circumscribes a fluid passage. The port and the fluid passage establish the fluid communication path. Also in a preferred embodiment, as described in detail below, the rod forms a ball that is configured so that it can mate with the valve seat. Moreover, a filter surrounds the distal end of the plunger tube and is juxtaposed with the inlet ports that are formed by the plunger tube. The valve body forms an o-ling groove and includes an o-ring disposed therein.

In another aspect of the present invention, a two-stage parallel spring solenoid valve includes a plunger tube that defines a distal end and a proximal end. A plunger stop is disposed within the proximal end of the plunger tube and a hollow valve body that forms a valve seat is disposed within the distal end of the plunger tube. Additionally, a plunger assembly is disposed within the plunger tube. In this aspect of the present invention, the plunger assembly includes a plunger rod that is slidably disposed within the plunger tube. The plunger rod is movable between a closed position, wherein the plunger rod engages the valve seat to block fluid flow through the valve and an open position, wherein the plunger rod is distanced from the valve seat.

In still another aspect of the present invention, a system for stabilizing a vehicle while braking includes a master cylinder, at least one wheel cylinder and a two-stage parallel spring solenoid valve that selectively directs hydraulic brake fluid to the wheel cylinders.

The present invention will now be described, by way of example, with reference to the accompanying drawings, in which:

DESCRIPTION OF AN EMBODIMENT OF THE INVENTION

Figure 1:
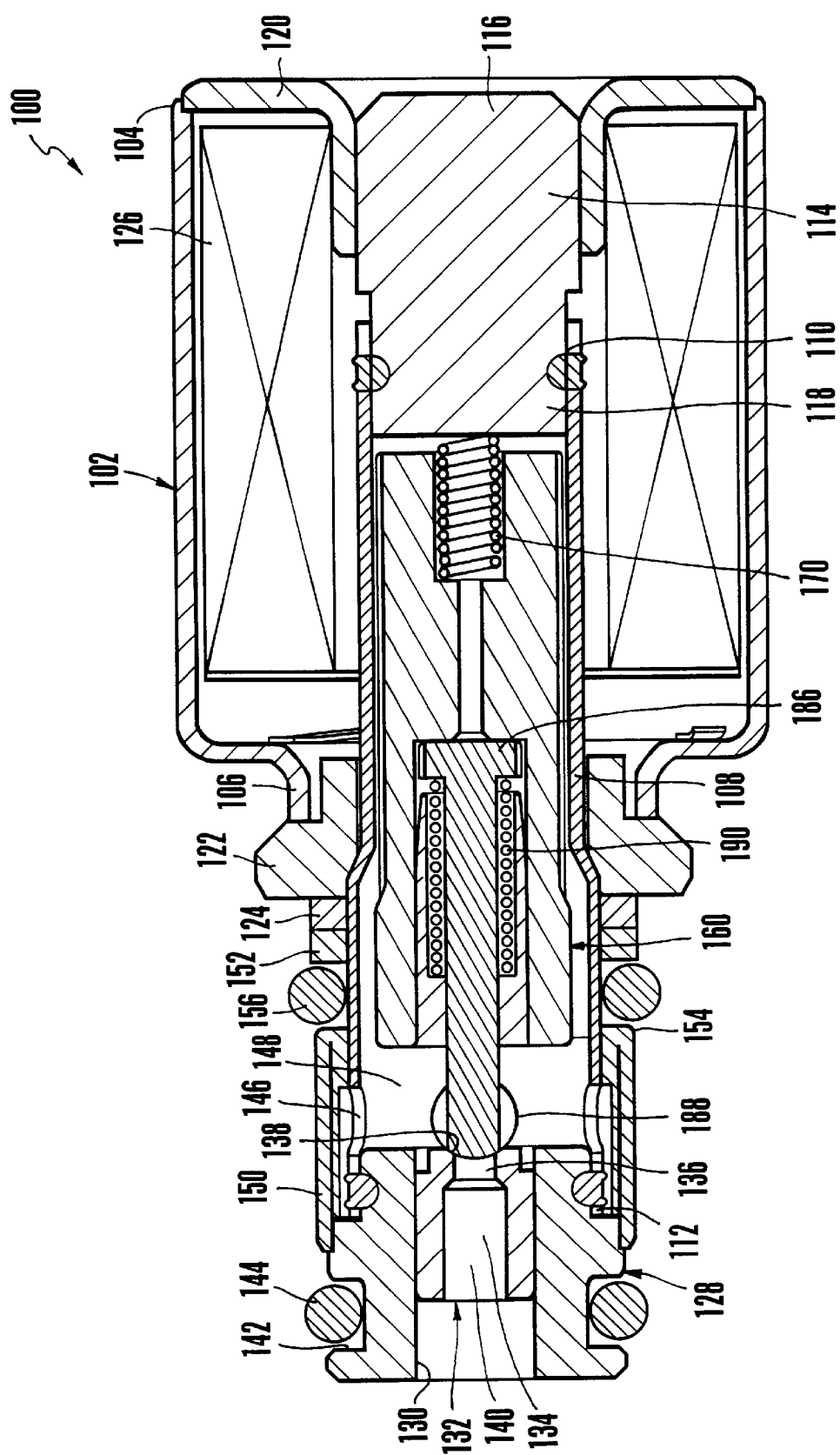
FIG. 1 is a cross-sectional view of the valve in the closed configuration.

Referring initially to FIG. 1, a two-stage parallel spring solenoid valve is shown and generally designated 100. FIG. 1 shows that the two-stage parallel spring solenoid valve 100 includes a metal, hollow, generally cylindrical coil housing 102 having an open proximal end 104 and an open distal end 106.

Within the coil housing 102 is a hollow, generally cylindrical plunger tube 108, having a proximal end 110 and a distal end 112. A solid generally cylindrical plunger stop 114 is disposed in the tube 108 at proximal end 110, and the stop 114 defines a proximal end 116 juxtaposed with the proximal end 104 of the coil housing 102 and a distal end 118 that, in a preferred embodiment, is sized so that it can be slip fitted into the proximal end 110 of the plunger tube 108.

Additionally, a hollow end cap 120 surrounds the proximal end 116 of the plunger stop 114 and is engaged along its outer periphery with the housing 102 to enclose the proximal end 104 thereof. A hollow plunger tube support flange 122 surrounds the plunger tube 108 near the distal end 112 of the tube 108 and abuts the distal end 106 of the coil housing 102 to enclose the distal end 106. Thus, FIG. 1 shows that the hollow end cap 120 is disposed within the open proximal end 104 of the coil housing 102 and the plunger tube support flange 122 is disposed within the open distal end 106 of the coil housing 102. A locking ring 124, in a surrounding relationship with the plunger tube 108, abuts the plunger tube support flange 122 and holds the plunger tube 108 snugly in place.

FIG. 1 also shows that the coil housing 102 holds a hollow toroidal coil 126 of wire. The coil 126 closely surrounds the plunger tube 108 and the plunger stop 114, and is magnetically coupled to the plunger described below.

Moving to the left side of FIG. 1, a hollow, generally cylindrical valve body 128 is disposed within the distal end 112 of the plunger tube 108. The valve body 128 is formed with a central bore 130 that is configured to receive an internal, hollow, cylindrical valve fitting 132 which is disposed in the valve body 128.

As shown in FIG. 1, the internal valve fitting 132 is formed with a central fluid passage 134 having an inlet end 136 circumscribed by a valve seat 138 and an outlet end 140. The valve body 128 is circumscribed by a distal o-ring groove 142 that is sized to receive a distal o-ring 144.

FIG. 1 also shows that the plunger tube 108 is formed with one or more inlet ports 146 that provide fluid communication to a high pressure fluid chamber 148 established between the valve body 128 and the plunger, described in detail during the discussion of FIG. 2 below. A ring-shaped filter 150 covers the inlet ports 146 to remove particles from fluid passing through the ports 146. Moreover, a spacer ring 152 surrounds the plunger tube 108 and abuts the support ring 124. A proximal o-ring groove 154 is established between the filter 150 and the spacer ring 152, and is sized to receive a proximal o-ring 156.

Figure 2:
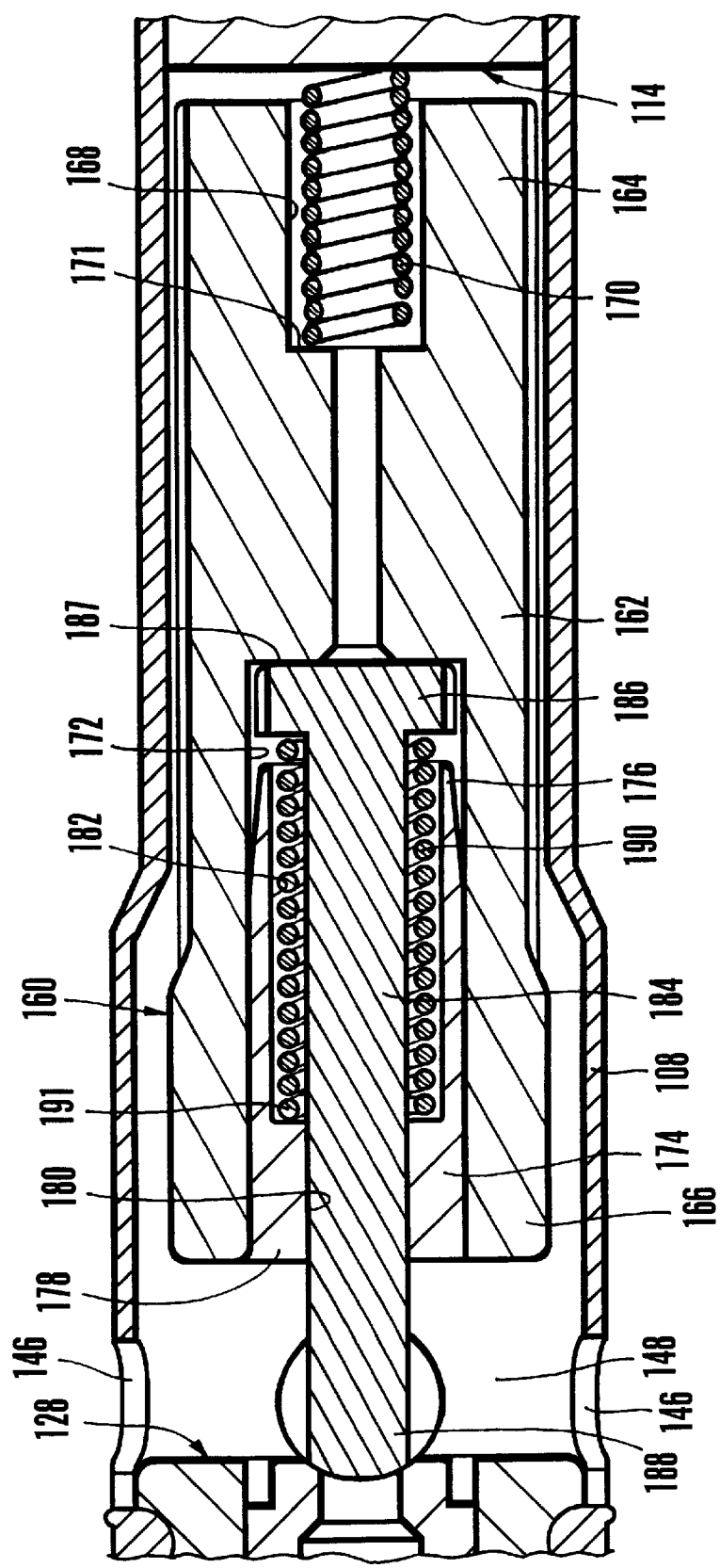
FIG. 2 is a detail cross-sectional view of the plunger assembly.

In accordance with the present invention and now referring to FIGS. 1 and 2, a parallel spring plunger assembly 160 is slidably disposed within the plunger tube 108. As shown best in FIG. 2, the plunger assembly 160 includes a plunger 162 having a proximal end 164 and a distal end 166. The proximal end 164 of the plunger 162 is formed with a bore 168 that is sized to receive an external spring 170 installed in compression between a bore face 171 of the plunger 162 and the plunger stop 114.

Additionally, the distal end 166 of the plunger 162 is formed with a bore 172 that is sized to receive a hollow generally cylindrical plunger guide 174 having a proximal end 176 and a distal end 178. In a preferred embodiment, the plunger guide 174 is press fitted into the distal end 166 of the plunger 162, although the guide 174 can be made integrally with the plunger 162. Moreover, the plunger guide 174 is formed with a central bore 180 that widens near the middle of the plunger guide 174 and extends to the proximal end 176 of the plunger guide 174 to from an annular spring chamber 182 between the plunger guide 174 and the plunger rod described below.

FIG. 2 further shows a solid generally cylindrical plunger rod 184 slidably disposed within the plunger guide 174. The plunger rod 184 widens at its proximal end to form an enlarged cylindrical base 186 that is disposed just beyond the annular spring chamber 182 between the plunger guide 174 and a stop face 187 of the plunger 162.

Conversely, the distal end of the plunger rod 184 forms a spherical plunger ball 188 that selectively engages the valve seat 138 formed in the valve body 128 to selectively block fluid communication between the high pressure fluid chamber 148 and the valve body inlet 136. FIG. 2 also shows an internal spring 190 within the annular spring chamber 182 and disposed around the plunger rod 184. The internal spring 190 is installed in compression between a spring face 191 of the plunger guide 174 and the plunger rod base 186.

Figure 5:
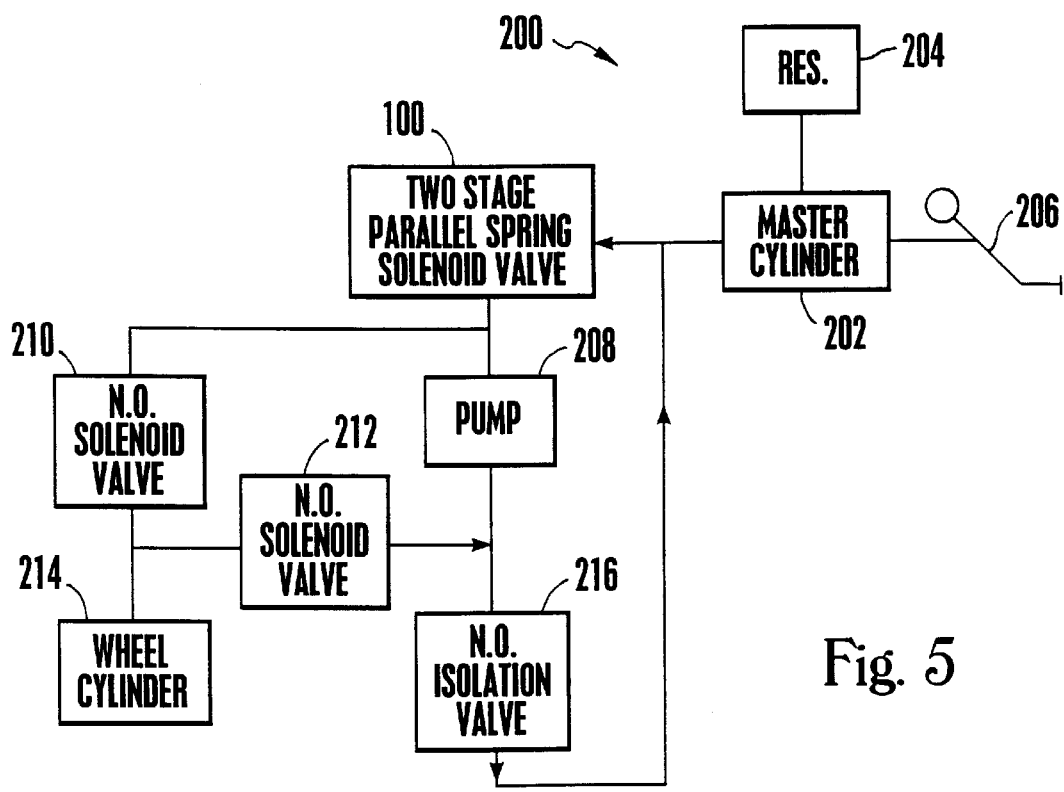
FIG. 5 is a block diagram representing the system in which a two-stage parallel spring solenoid valve may be installed.

To understand the use of the valve of the present invention, reference is made briefly to FIG. 5, which shows an exemplary vehicle brake system 200 in which the present valve can be used. As shown, the system 200 includes a master cylinder 202 in fluid communication with a fluid reservoir 204. The master cylinder 202 is mechanically actuated by a brake pedal 206 that is depressed by the foot of a driver. Installed between the master cylinder 202 and a fluid pump 208, and in fluid communication with both, is the two-stage parallel spring solenoid valve 100.

FIG. 5 shows that the two-stage parallel spring solenoid valve 100 is also in fluid communication with a normally closed solenoid valve 210 that is, in turn, in fluid communication with a normally open solenoid valve 212 and a wheel cylinder 214. FIG. 5 also shows that the normally open solenoid valve 212 and the pump 208 each provide fluid communication to a normally open isolation valve 216 which then provides fluid communication back to the two stage solenoid valve 100.

Initially, when the brake pedal 206 is depressed by a driver, the two-stage parallel spring solenoid valve 100 opens as described below to deliver fluid to the wheel cylinder 214 and to the pump 208 in order to prime it. Once primed, the pump 208 may pump fluid through the normally open isolation valve 216 and back through the two stage solenoid valve 100 and to the rest of the system 200. The two-stage parallel spring solenoid valve 100 and the other valves 210, 212, and 216 open and close in accordance with ABS principles to control the stability of the vehicle by regulating the flow of fluid to the wheel cylinders 214.

OPERATION

Initially, with no pressure and flow in the braking system 200 the two-stage parallel spring solenoid valve 100 is in the closed configuration as shown in FIG. 1. In the closed configuration, the coil 126 that activates the plunger assembly 160 is de-energized; however, the combined force of the external spring 170 and the internal spring 190 overcome any fluid pressure in the central fluid passage 134 of the valve fitting 132, seating the plunger ball 188 on the valve seat 138 and blocking fluid communication between the high pressure fluid chamber 148 and the central fluid passage 134 within the valve fitting 132.

Figure 3:
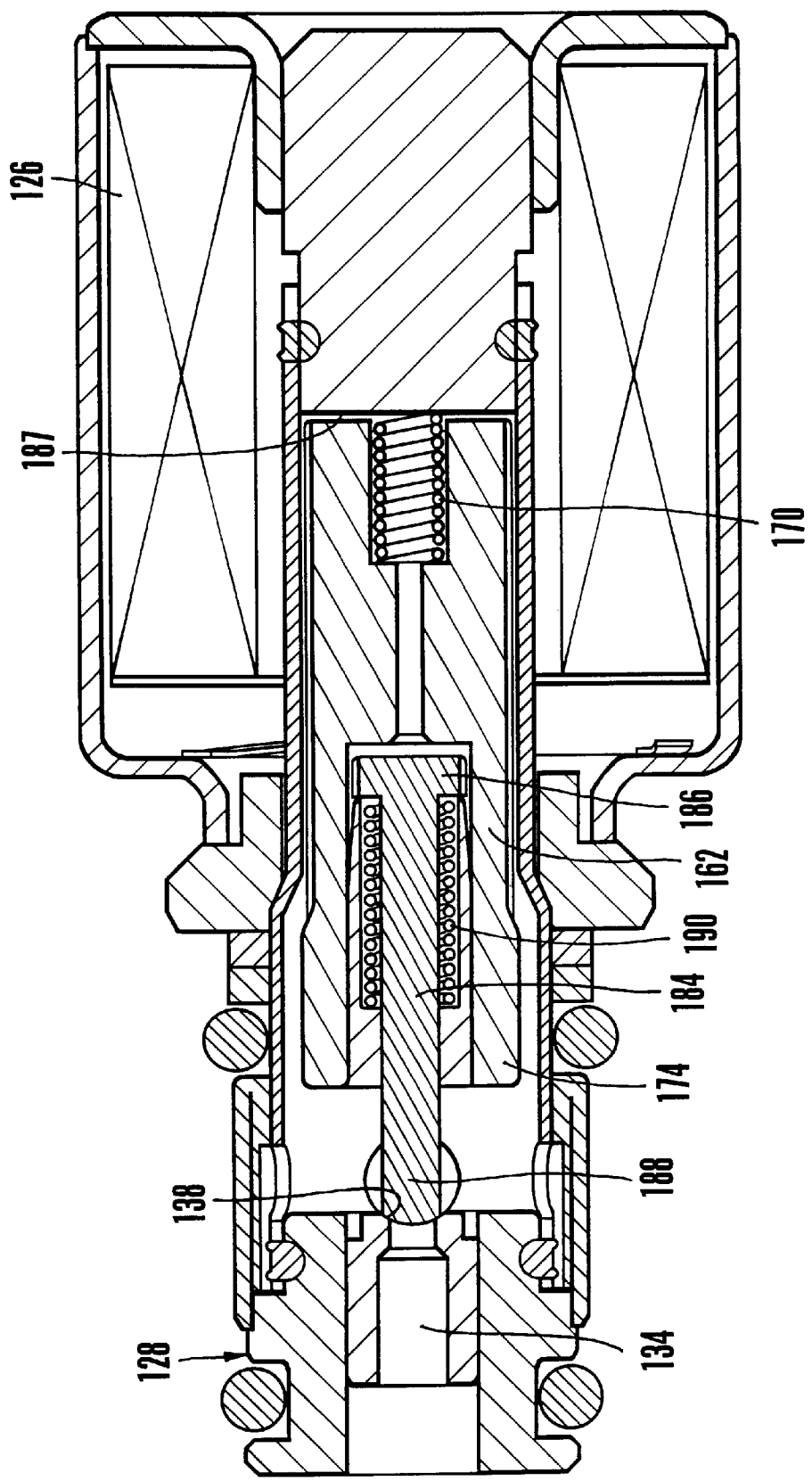
FIG. 3 is a cross-sectional view of the valve in the intermediate configuration.

When high pressure is sensed within the high pressure fluid chamber 148, a high pressure signal is generated to energize the coil 126, pulling the plunger 162 to the right, looking down on FIG. 3, against the force of the external spring 170 and internal spring 190. As shown, this moves the valve 100 to the intermediate configuration, wherein the plunger ball 188 remains seated against the valve seat 138 by virtue of high pressure acting on the plunger ball 188 within the chamber 148. In the intermediate configuration, the proximal end 176 of the plunger guide 174 moves into contact with the plunger rod base 186.

Figure 4:
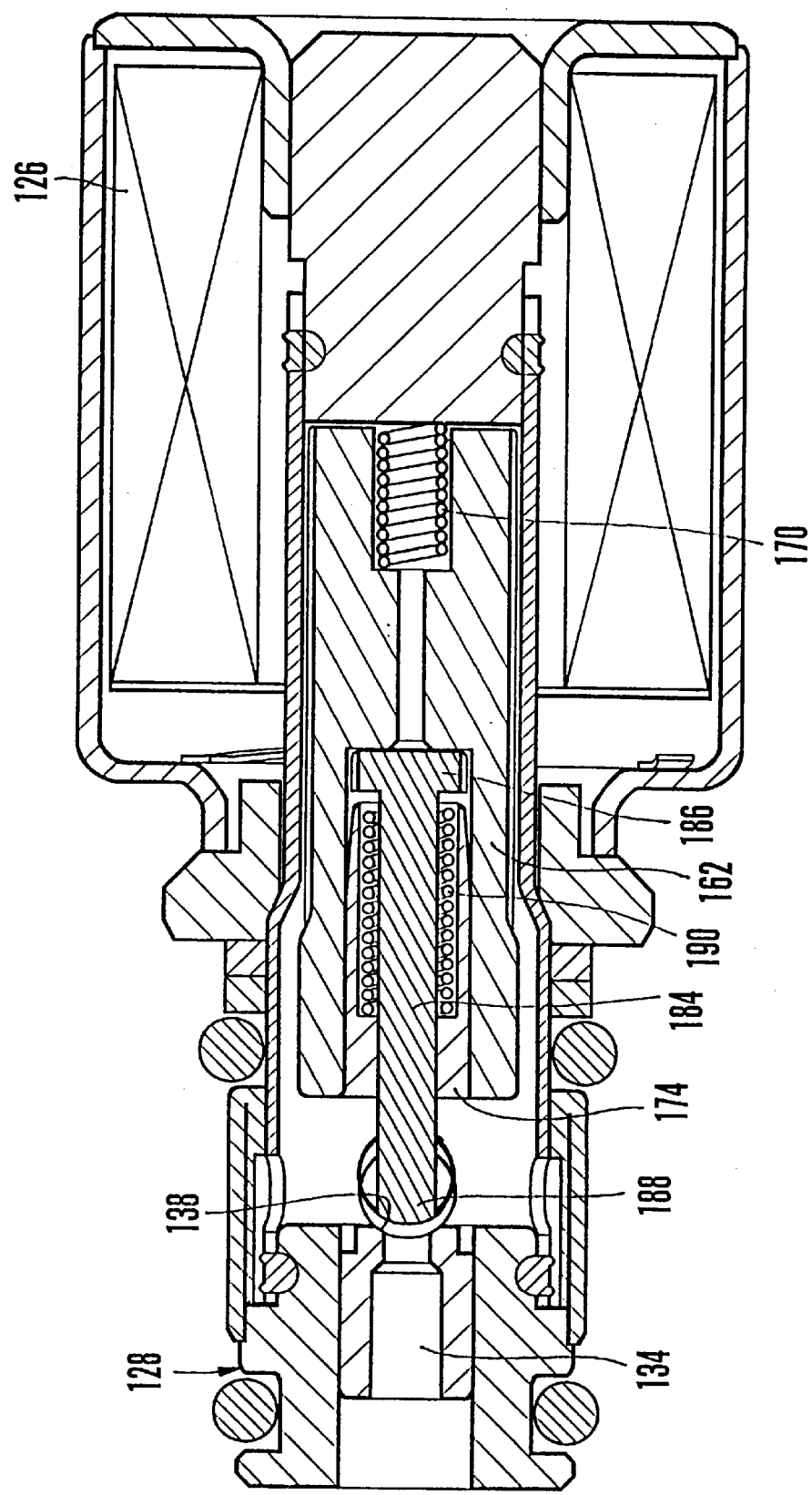
FIG. 4 is a cross-sectional view of the valve in the open configuration.

As the plunger 162 continues to move to the right, the plunger guide 174 abuts the stop face 187 of the plunger rod base 186. Consequently, the available magnetic force generated by the energized coil 126 when the plunger assembly 160 is in the intermediate position can more easily overcome the hydraulic forces acting on the plunger ball 188 to unseat the plunger ball 188 and thereby move the valve 100 into the open configuration shown in FIG. 4. The open configuration of the valve 100 permits fluid communication through the ports 146, the high pressure fluid chamber 148, and out of the central fluid passage 134.

When the coil 126 is de-energized, the external spring 170 and the internal spring 190 act in concert to return the plunger 162 and the plunger rod 184 to the closed configuration, wherein the plunger ball 188 again engages the valve seat 138 and blocks fluid flow through the valve 100.

With the configuration of structure described above, it is to be appreciated that the valve 100 does not require an oversized coil to simultaneously overcome the spring force that is required to maintain the valve in the closed configuration and the hydraulic forces within the valve. Instead, the coil 126 can be sized to open the valve 100 in stages, i.e., to first overcome the spring force holding the valve 100 in the closed configuration, and then to overcome the hydraulic forces holding the valve closed. By essentially operating in stages as described above, the two-stage parallel spring solenoid valve 100 is able to function as described without requiring an expensive and bulky coil assembly.

While the particular two-stage parallel spring solenoid valve as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A two-stage parallel spring solenoid valve for a vehicle fluid system, comprising:

a coil housing;

a coil in the housing;

a plunger tube within the coil;

a plunger stop disposed within the plunger tube;

a fluid communication path; and a plunger assembly slidably disposed relative to the coil housing, the plunger assembly including a plunger and a rod slidably received in the plunger, the plunger defining a proximal end proximal the plunger stop, the proximal end of the plunger forming a bores an internal spring being disposed to urge the rod to move relative to the plunger and an external spring being disposed in compression between the proximal end of the plunger and the plunger stop at least partially within the bore, the external spring urging the plunger to move relative to the housing, wherein the springs cooperate to move the plunger assembly to block the fluid communication path when the coil is de-energized, the coil being selectively energized to cause the plunger assembly to move to open the fluid communication path.

2. The valve of claim 1, further comprising:

a hollow plunger tube disposed in the housing and defining a distal end, the plunger tube being formed with at least one port; and a valve body disposed at the distal end of the plunger tube, the valve body including a valve seat circumscribing a fluid passage, the fluid communication path being established by the port and the fluid passage.

3. The valve of claim 2, wherein the rod is formed with a ball configured for mating with the valve seat.

4. The valve of claim 2, further comprising a filter surrounding the distal end of the plunger tube and juxtaposed with the inlet port formed in the plunger tube.

5. The valve of claim 2, wherein the valve body is formed with an o-ring groove and further includes an o-ring disposed therein.

* * * * *